United States Patent Office 2,762,006
Patented Sept. 4, 1956

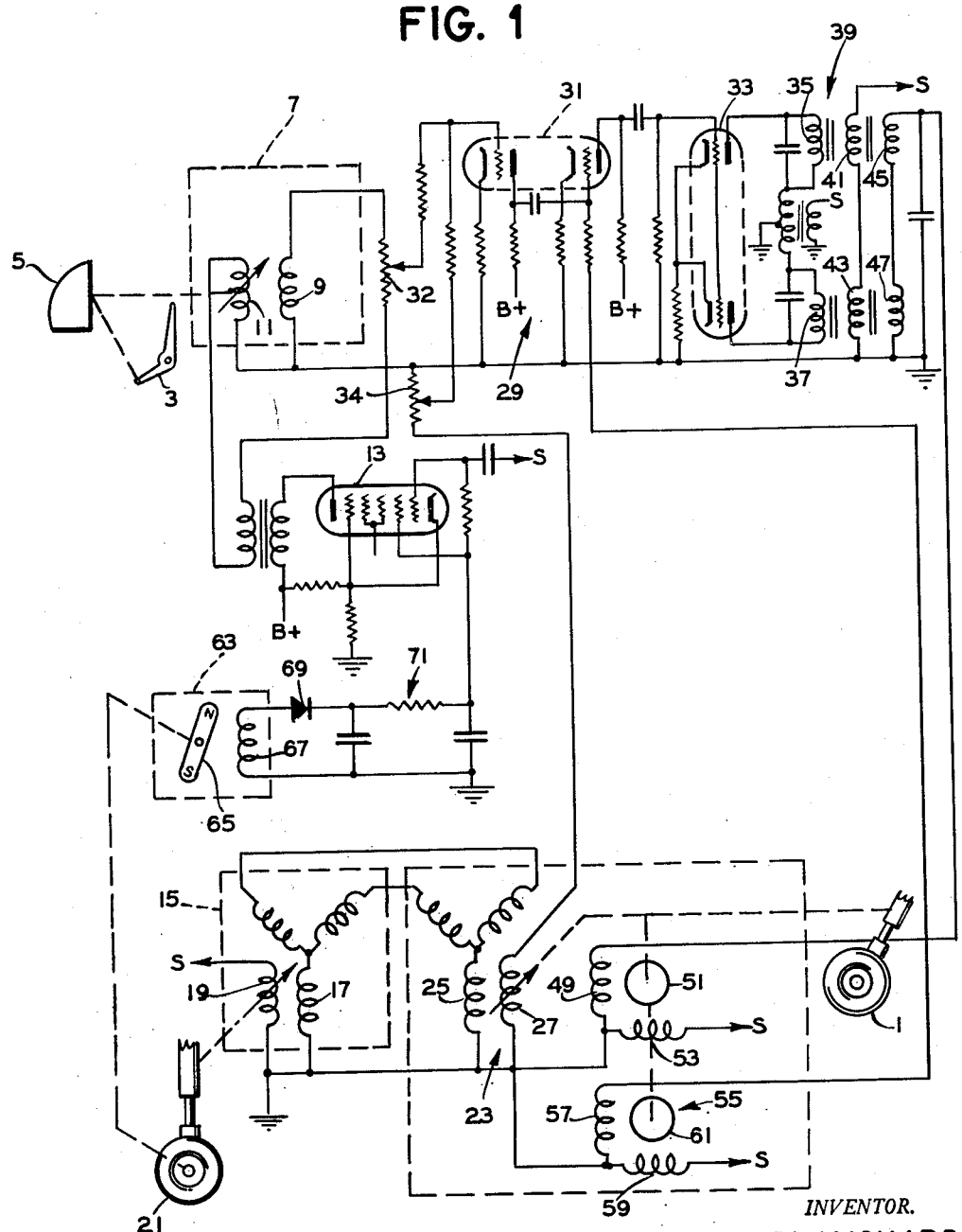

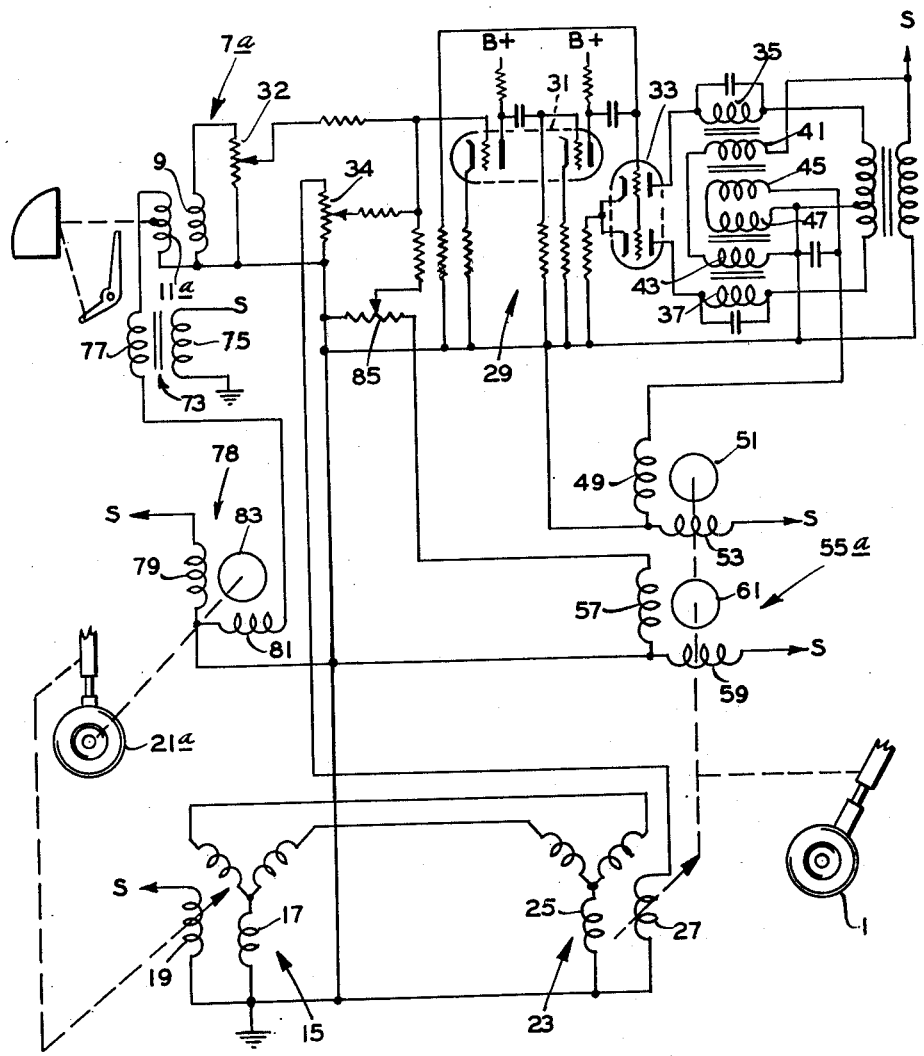

2,762,006

CONTROL SYSTEM

Allen W. Blanchard, Allendale, N. J., assignor to Bendix Aviation Corporation, Teterboro, N. J., a corporation of Delaware Application March 17, 1952, Serial No. 276,963

12 Claims. (Cl. 318—489)

The invention relates to control systems and more particularly to a control system for aircraft for guiding the craft when it is on the ground.

When a craft with fixed landing wheels lands across wind, unless the pilot is highly skilled, the craft will be subjected to severe jolts and perhaps be damaged because the heading of the craft is not parallel to the direction of flight. To facilitate landing, it has been suggested to caster the main landing wheels so that the wheels align themselves to the direction of flight irrespective of the heading of the craft. However, some difficulty has been encountered in steering a craft with castered main landing wheels, particularly when the craft has a steerable nose wheel. When the nose wheel touches the ground, it should be aligned with the main landing wheels or the plane may go into a ground loop and be severely damaged.

In addition, aircraft moving on the ground at relatively high speeds may be controlled by the rudder, but at low speeds the rudder control is ineffective. If movement of the steerable nose wheel is in the same proportion as angular movement of the rudder when the plane is moving rapidly on the ground, the nose wheel may be turned to an angle causing the craft to veer sharply in the direction in which the nose wheel is turned.

One object of the present invention is automatically to maintain the steerable wheel and the castered main landing wheels of a craft in the same relative position when the rudder control is not being operated.

Another object is to control a craft moving on the ground at high speeds by the rudder alone and then gradually relinquish control automatically to the steerable wheel as the craft decreases speed.

Another object is to vary response of the steerable wheel to movement of the rudder control as a function of craft speed.

A further object is to vary response of the steerable wheel to movement of the rudder control inversely to the speed of the craft.

The invention contemplates a control system for steering a craft when the craft is on the ground. A transmitter device provides signals corresponding to the angular position of the castered main landing wheels, and another transmitter device provides signals corresponding to the position of a controller operatively connected to the craft rudder, and a follow-up device provides signals corresponding to the angular position of the steerable wheel. The signals control a motor drivably connected to the steerable wheel and follow-up device. The rudder transmitter is energized as a function of the speed of the craft so that angular movement of the nose wheel relative to the rudder varies as a function of the craft speed.

The foregoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for the purpose of illustration and description only and are not intended as a definition of the limits of the invention.

In the drawings,

Figure 1 is a schematic wiring diagram showing a control system constructed according to the invention, and Figure 2 is a schematic wiring diagram showing another embodiment of the invention.

Referring now to the drawings for a more detailed description of the novel control system of the present invention, the control system is shown in Figure 1 as controlling a steerable wheel 1 of an aircraft in response to movement of a controller 3 which may be operated manually or by an automatic pilot controlled by compass heading, radio guidance signals, or any other suitable means. A rudder 5 is drivably connected to controller 3 for angular displacement about a vertical axis.

An inductive transmitter device 7 has a single phase stator winding 9 inductively coupled to a single phase rotor winding 11 drivably connected to the rudder so that angular displacement of the rotor winding relative to the stator winding provides signals corresponding to the angular displacement of the rudder from trim position. Rotor winding 11 is energized by the output of a variable gain amplifier 13 energized by a power source S and controlled in the manner described hereinafter.

An inductive transmitter device 15 has a three-phase stator winding 17 inductively coupled to a single phase rotor winding 19 energized by alternating power source S and drivably connected to one of the castered main landing wheels 21 so that angular displacement of the rotor winding relative to the stator winding corresponds to the angular displacement of the main landing wheel from straight-ahead position. An inductive follow-up device 23 has a three-phase stator winding 25 connected back to back with stator winding 17 of transmitter device 15 and a single phase rotor winding 27 inductively coupled to the stator winding and drivably connected to the steerable wheel so that angular displacement of the rotor winding relative to the stator winding corresponds to angular displacement of the steerable wheel from straight-ahead position.

When the main landing wheel and steerable wheel are in the same corresponding angular positions, then no signal voltage appears across rotor winding 27 of inductive device 23; but when the main landing wheel and steerable wheel are not in corresponding angular positions, then a signal appears across rotor winding 27 corresponding in phase and amplitude to the difference in angular position of the main landing wheel and the steerable wheel. The signal is added algebraically to the signal from rudder transmitter 7 and the signal sum is applied to the input of a two stage amplifier 29 including a double triode 31. The amplitude of the signal from rudder transmitter 7 and follow-up device 23 may be proportioned relative to one another by applying the signals to potentiometers 32, 34 at the input of amplifier 29.

The output of the amplifier is fed to a discriminator 33 to determine the phase of the voltage, and the discriminated output of the amplifier is applied to the saturating windings 35, 37 of a magnetic amplifier 39. The primary windings 41, 43 of magnetic amplifier 39 are connected in series-aiding relation to alternating power source S and secondary windings 45, 47 of magnetic amplifier 39 oppose one another and are connected in series with the variable phase 49 of a two-phase motor 51 drivably connected to steerable wheel 1 and rotor winding 27 of follow-up device 23. The fixed phase winding 53 of motor 51 is connected to alternating power source S.

A rate generator 55 of the kind shown and described in Riggs Patent 2,115,086 issued April 26, 1938, has a pair of stator windings 57, 59 disposed 90 electrical degrees from one another. Stator winding 59 is connected to alternating power source S and stator winding 57 is connected to the input of the second stage of amplifier 29.

A squirrel cage rotor 61 drivably connected to motor 51 provides a rate signal in stator winding 57 proportional to motor speed as described in the above-mentioned patent. The rate signal is applied to the input of the second stage of amplifier 29, where it is combined with the amplified signal sum from rudder transmitter 7 and follow-up device 23.

With the arrangement described, when rudder 5 is in trim position, steerable wheel 1 is aligned with main landing wheels 21. If the angular position of the steerable wheel does not instantaneously correspond to the angular position of the main landing wheel, then an error signal corresponding to the difference in angular positions of the wheels develops in rotor winding 27 of follow-up device 23 and is applied to amplifier 29. The discriminated output of the amplifier unbalances the magnetic amplifier and energizes motor 51 which turns wheel 1 and drives rotor winding 27 of follow-up device 23 to null position relative to rotor winding 19 of transmitter 15 and thereby angularly aligns steerable wheel 1 with the main landing wheels.

When rotor winding 11 of transmitter device 7 is displaced angularly relative to stator winding 9 by movement of rudder controller 3, a signal is applied to amplifier 29 and the output of the amplifier energizes motor 51 which angularly displaces steerable wheel 1 until rotor winding 27 of follow-up device 23 is displaced relative to rotor winding 19 of transmitter device 15 to provide a signal equal and opposite to the signal from transmitter device 7. With uniform excitation of rotor winding 11 of transmitter device 7 and rotor winding 27 of follow-up device 23, angular displacement of the steerable wheel corresponds to angular displacement of the rudder.

To gradually decrease response of the steerable wheel to movement of the rudder controller as speed of the craft increases, excitation of rotor winding 11 of transmitter device 7 is varied by varying the output of amplifier 13 substantially as described in applicant's copending application Serial No. 193,928 filed November 3, 1950, and assigned to the same assignee as the present application.

An alternating current generator 63 has a permanent magnet rotor 65 driven by the main landing wheel at a speed corresponding to the ground speed of the craft, or rotor 65 may be driven by any suitable means at a speed corresponding to the air speed of the craft. Generator 63 has a stator winding 67 connected through a rectifier 69 and an R. C. filter circuit 71 to the input of variable gain amplifier 13. The rectified filtered voltage from generator 63 biases amplifier 13 to vary its output as a function of the speed of the craft. The output of generator 63 is applied to amplifier 13 as an increasingly negative bias with increase of generator speed.

As the craft increases speed and the output of generator 63 increases, the output of amplifier 13 decreases and excitation of rotor winding 11 of transmitter device 7 decreases accordingly. Under these conditions only a small angular displacement of rotor winding 27 of follow-up device 23 and of steerable wheel 1 is required to cancel the error signal created by substantial angular displacement of rotor winding 11 of transmitter device 7 by controller 3.

As the ground speed of the craft and the output of generator 63 decreases, the output of amplifier 13 increases so that relatively large angular displacement of rotor 27 of follow-up device 23 and steerable wheel 1 is required to nullify the signal from transmitter device 7.

The arrangement shown in Figure 2 is substantially the same as the arrangement shown in Figure 1 and described above except that rudder transmitter 7a is energized through a transformer 73 having a primary winding 75 connected to alternating power source S and a secondary winding 77 connected to the rotor winding 11a of rudder transmitter 7a. A generator 78 has a winding 79 energized by alternating power source S and a winding 81 connected in series with secondary winding 77 of transformer 73. Generator 78 has a rotor 83 driven by main landing wheel 21a. Rotor 83 induces in winding 81 a voltage corresponding to the speed of the craft as it moves on the ground, and winding 81 of generator 78 is connected in the circuit oppositely to secondary winding 77 of transformer 73 to decrease energization of rotor winding 11a of transmitter 7a with increase in craft speed, and to increase energization of rotor winding 11a with decrease in craft speed. Also, the output of rate generator 55a is applied to the first stage of amplifier 29a through a potentiometer 85, instead of to the second stage as in Figure 1.

The arrangements described automatically maintain the steerable wheel and the main landing wheels of the craft in the same relative position when the rudder control is not being operated, and response of the steerable wheel to movement of the rudder control varies inversely to the speed of the craft. A craft moving on the ground at high speeds may be controlled by the rudder alone, and control of the craft is automatically relinquished to the steerable wheel as the craft decreases speed.

While the control system has been shown and described as applied to steering aircraft, it should be understood that the invention is applicable to any system wherein a controlled device is responsive to a pair of controllers and means is provided to vary response of the controlled device to one of the controllers as a function of a changing condition without changing response of the controlled device to the other controller. Also, while the specification refers to main landing wheels and castered landing wheels, it should be understood that the term is used in its broadest sense and may include any landing elements such as skis, floats, or other devices.

Although but two embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In combination, a first controller, a second controller, separate transmitter means operated by each of said controllers and providing signals corresponding to the positions of said controllers, a controlled device, follow-up means for providing signals corresponding to the relative position of one of said controllers and said controlled device, driving means drivably connected to said controlled device and to said follow-up means and responsive to combined signals from said transmitter means and from said follow-up means, and means to vary the amplitude of the signals from one of said transmitter means as a function of a predetermined condition with predetermined movement of the associated controller.

2. In combination, a first controller, a second controller, separate transmitter means operated by each of said controllers and providing signals corresponding to the positions of said controllers, a controlled device, follow-up means for providing signals corresponding to the position of said controlled device, driving means drivably connected to said controlled device and to said follow-up means and responsive to combined signals from said transmitter and follow-up means, the magnitude of a signal developed by a transmitter means for a given position being a function of the energization of the transmitter means, means for energizing said transmitter and follow-up means, and means responsive to a predetermined condition for varying the energization of one of said transmitter means relative to said follow-up means so that the response of said controlled device to the associated controller varies as a function of said predetermined condition, but without affecting response of said controlled device to said other controller.

3. In combination, a first controller, a second controller, transmitter devices operated by each of said controllers and providing signals corresponding to the positions of said controllers, a controlled device, a follow-up device for providing signals corresponding to the position of said controlled device, driving means drivably connected to said controlled device and to said follow-up device and responsive to combined signals from said transmitter and follow-up devices, the magnitude of said signals for a given position being a function of the energization of said transmitter devices, means for energizing said transmitter and follow-up devices, one of said transmitter energizing means including an amplifier, and means responsive to a predetermined condition and providing a biasing voltage for said amplifier for changing energization of the associated transmitter device in accordance with the predetermined condition whereby the response of said controlled member to the associated controller varies as a function of the predetermined condition without changing response of said controlled device to said other controller.

4. In combination, a first controller, a second controller, signal means operated by said first controller for providing a first signal corresponding to the position of said first controller, a transmitter inductive device operated by said second controller, an inductive receiver device connected to said transmitter, a controlled device, a follow-up device to operate said receiver device for providing a second signal corresponding to the relative position of said second controller and said controlled device, driving means drivably connected to said controlled device and to said follow-up device and responsive to combined signals from said transmitter and follow-up devices, a source of electrical energy for energizing said signal means and said transmitter and follow-up devices, and means responsive to a predetermined condition and connected to signal means for providing a voltage of a phase opposite to the phase of said source to decrease the energization of said signal means whereby the response of said controlled device to said first controller varies as a function of said predetermined condition without affecting response of said controlled device to said second controller.

5. In a control system for use in aircraft having a rudder, a castered main landing element and a steerable landing element, means for maintaining said steerable element in the same relative angular position as said main landing element, controller means for operating said rudder and said steerable element, and means for varying response of said steerable element to said controller to vary movement of said steerable element relative to movement of said rudder as an inverse function of craft speed.

6. In a control system for use in aircraft having a rudder, a castered main landing element and a steerable landing element, transmitter means operated by said castered main landing element, follow-up means operated by said steerable element, said means providing signals corresponding to the positions of said elements, controller means for operating said rudder and said steerable element, transmitter means operated by said rudder and providing signals corresponding to the position of said rudder, driving means drivably connected to said steerable element and to said follow-up means and responsive to combined signals from said transmitter and follow-up means, and means to vary the amplitude of the signals from said rudder transmitter as a function of the speed of the craft to vary movement of said steerable element relative to said rudder.

7. In a control system for use in aircraft, a rudder, a controller for said rudder, a castered main landing element, transmitter means operated by said rudder and said castered main landing element and providing signals corresponding to the positions of said rudder and said main landing element, a steerable element, follow-up means for providing signals corresponding to the position of said steerable element, driving means drivably connected to said steerable element and to said follow-up device and responsive to combined signals from said transmitter and follow-up means, and means to vary the amplitude of the signals from said rudder transmitter device as a function of the speed of the craft to vary movement of said steerable element relative to said rudder.

8. In a control system for use in aircraft, a castered main landing wheel, transmitter means operated by said wheel and providing signals corresponding to the angular position of said wheel, a steerable wheel, a follow-up means operated by said steerable wheel providing signals corresponding to the position of said steerable wheel, driving means drivably connected to said steerable wheel and said follow-up means and responsive to signals from said transmitter and follow-up means and maintaining said steerable wheel in the same relative angular position as said castered main landing wheel, a rudder, controller means for operating said rudder, transmitter means operated by said rudder and providing signals corresponding to the angular position of said rudder, said driving means being responsive to signals from said rudder transmitter means and moving said steerable wheel to a position corresponding to the position of said rudder independently of said main landing wheel, and means to vary the amplitude of the signals from said rudder transmitter means as a function of the speed of the craft to vary movement of said steerable wheel relative to said rudder.

9. A control system for use in aircraft having a rudder, a castered main landing wheel and a steerable wheel, first and second electric signal means operated by said rudder and said wheels, respectively, for providing signals corresponding to the positions of said rudder and said wheels, driving means drivably connected to said steerable wheel and responsive to signals from both said signal means, means for energizing both said signal means, and means responsive to the speed of the craft for varying energization of said first signal means relative to said second signal means to vary the amplitude of the signals from said rudder signal means as a function of the speed of the craft to vary movement of said steerable wheel relative to said rudder.

10. In a control system for use in aircraft, a castered main landing wheel, a steerable wheel, first signal means operated by said wheels and providing signals corresponding to the angular positions of said wheels, driving means drivably connected to said steerable wheel and responsive to signals from said signal means and maintaining said steerable wheel in the same relative angular position as said castered main landing wheel, a rudder, second signal means operated by said rudder and providing signals corresponding to the angular position of said rudder, said driving means being responsive to signals from said rudder signal means and moving said steerable wheel to a position corresponding to the position of said rudder, means to energize both said signal means, and means responsive to the speed of the craft for varying energization of said second signal means relative to said first signal means to vary the amplitude of the signals from said second signal means as a function of the speed of the craft to vary movement of said steerable wheel relative to said rudder.

11. In a control system for use in aircraft having a castered main landing wheel, a steerable wheel and a rudder, signal means operated by said wheels and providing signals corresponding to the angular positions of said wheels, driving means drivably connected to said steerable wheel and responsive to signals from said signal means and maintaining said steerable wheel in the same relative angular position as said castered main landing wheel, signal means operated by said rudder and providing signals corresponding to the angular position of said rudder, said driving means being responsive to signals from said rudder signal means and moving said steerable wheel to a position corresponding to the position of said rudder, means for energizing the signal means operated by said wheels, and means for energizing the signal means operated by said rudder, said rudder operated signal means energizing means including an amplifier, and means responsive to the speed of the craft for providing a biasing voltage for said amplifier for changing energization of said rudder signal means in accordance with the speed of the craft to vary movement of said steerable wheel relative to movement of said rudder.

12. A control system for use in aircraft having a castered main landing wheel, a steerable wheel and a rudder, comprising transmitter and receiver signal means operated by said wheels for providing signals corresponding to the angular positions of said wheels, driving means drivably connected to said steerable wheel and responsive to signals from said transmitter and receiver signal means for maintaining said steerable wheel in the same relative angular position as said castered main landing wheel, further signal means operated by said rudder for providing signals corresponding to the angular position of said rudder, said driving means also being responsive to signals from said further signal means for moving said steerable wheel to a position corresponding to the position of said rudder, a source of electrical energy for energizing each of said signal means, and means responsive to the speed of the craft and connected to said further signal means for providing energization having a sense opposite to the sense of the energization of said source to decrease the net energization of said further signal means so that movement of said steerable wheel varies relative to movement of said rudder as the speed of the craft varies.

References Cited in the file of this patent

UNITED STATES PATENTS

| 1,772,161 | Short | Aug. 5, 1930 |
| 2,432,036 | Noxon | Dec. 2, 1947 |
| 2,612,331 | Frazier | Sept. 30, 1952 |

FOREIGN PATENTS

| 482,080 | Great Britain | Mar. 23, 1938 |